3,364,330
COVER ASSEMBLY
Ermanno Bassani, Corso Porta Vittoria 9,
Milan, Italy
Filed June 16, 1966, Ser. No. 558,074
3 Claims. (Cl. 200—168)

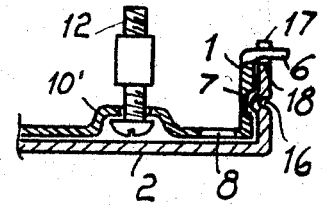
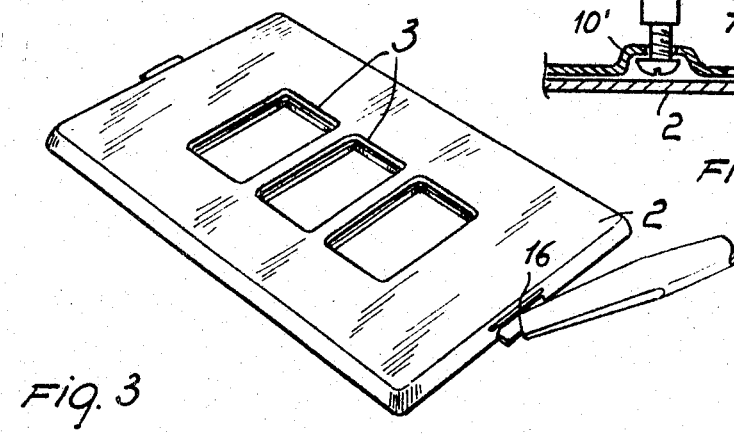
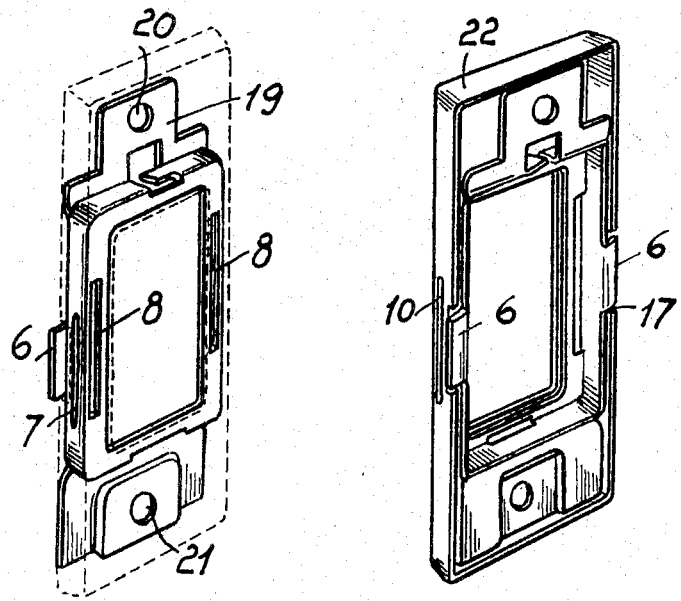
INVENTOR.
Ermanno Bassani
BY
Michael J. Striker
Atty

United States Patent Office 3,364,330
Patented Jan. 16, 1968

ABSTRACT OF THE DISCLOSURE

A cover assembly including a frame having an exposed front face and a pair of exposed side faces extending to one side of the front face inclined thereto. A cover plate for covering the frame includes the front portion and a pair of side portions, such portions being respectively adapted to overlie the front face and the side faces of the frame in juxtaposition therewith. Cooperating male and female coupling elements on the associated side faces and side portions are engageable with one another with a snap action for installing the cover plate on the frame. Release means are provided on the assembly and are accessible from the exterior of the cover plate in the installed condition of the latter for enabling disengagement of the cooperating male and female coupling elements.

---

This invention relates to an improvement in supporting and covering means for mounting electric devices, e.g., switches, especially those enclosed in walls.

Previously, the fastening of a cover plate took place by means of screws simultaneously fixing a small supporting frame and the cover plate onto a terminal box mounted in the wall. This method had a number of disadvantages namely the cover plate was difficult to mount as the exact position of bores which receive the screws was obscured by the cover plate. Another disadvantage was that the screws when being screwed in could come into contact with parts of the electric devices carrying electric current thus leaving a permanent dangerous point of contact exposed. A further disadvantage was that tightening of the screws strongly caused a distortion or even the breaking of the cover plate, especially when the latter was of plastics material.

According to the present invention there is provided a supporting and covering means for mounting one or more electric devices comprising a supporting frame adapted to be mounted on a terminal box and to which electric devices can be secured, and a cover plate which can be attached to the supporting frame by means of a pressure or snap fit between the cover plate and the supporting frame along at least a substantial part of the opposed edges of both the plate and the frame.

Figure 1:
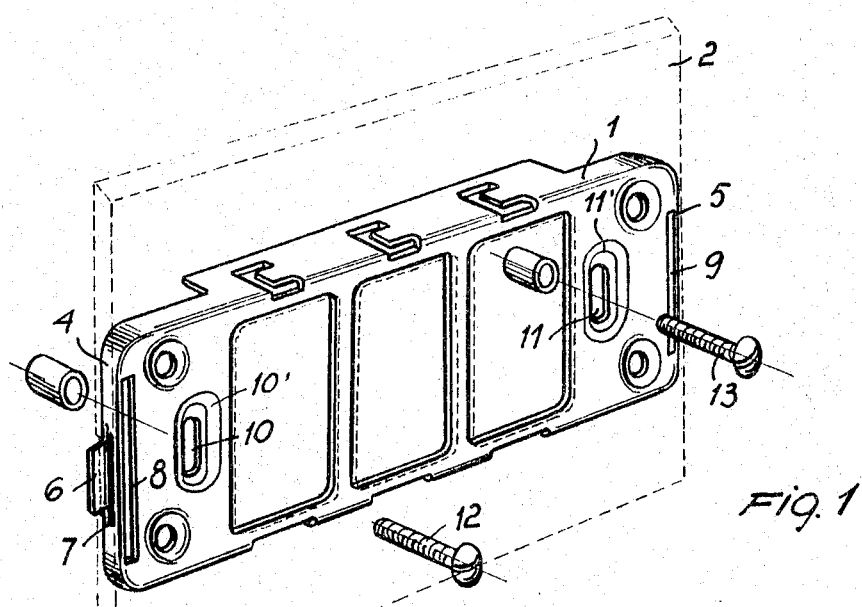
Figure 2:
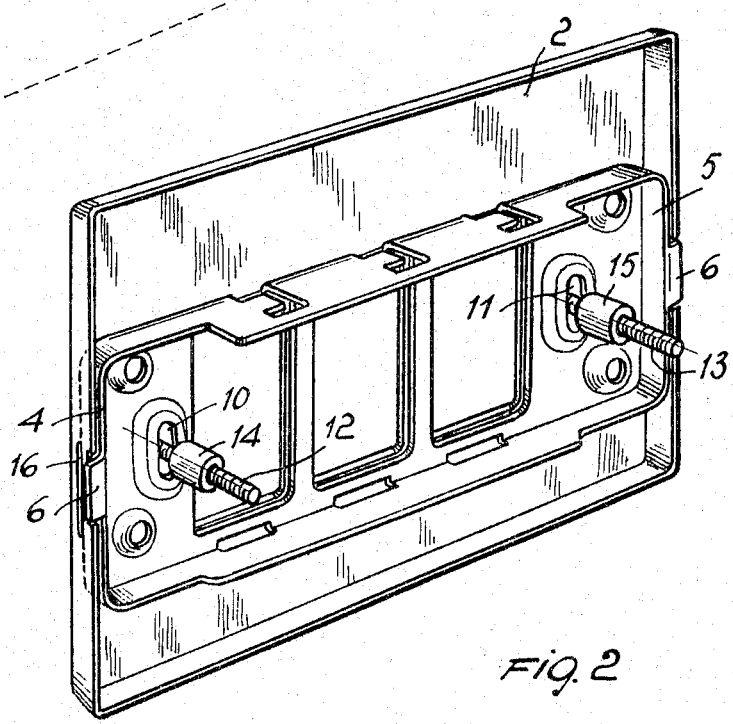

An illustrative embodiment will now be described with reference to the accompanying drawing, in which:

FIGURES 1, 2 and 3 refer to an installation supporting up to three electric devices;

FIGURES 4 and 5 refer to a second example of the invention in which only one electric device is supported;

FIGURE 6 shows a cross-section of a cover plate and a supporting frame, showing a coupling arrangement.

Referring to FIGURE 1 a supporting frame 1 is shown in position behind a cover plate 2 (the outline thereof only being indicated) which can be made of synthetic plastics material or of metal suitably insulated such as electrically oxidised aluminium. The frame 1 has cut-away sections into which electrical devices (not shown) are fitted such that they also protrude through identical cut-away sections 3 (FIGURE 3) in the cover plate 2. The frame 1 has side walls 4 and 5 at its opposed edges on each of which is provided the small tongue 6 projecting outwardly. Arranged parallel with the tongue 6 is a groove 7 (FIGURES 1 and 6). At either end of the frame 1 marginal slots 8 and 9 are positioned near the side walls 4 and 5 and running across the greater part of the height of the frame 1 with the purpose of imparting to the side walls 4 and 5 a degree of flexibility. Between the cut-away section and the marginal slots are holes 10 and 11 which are countersunk so that screws 12 and 13 when screwed up tightly have their heads beneath the outer surface of the frame. In FIGURE 2 small cylindrical washers 14 and 15 are placed on the screws 12 and 13 prior to the screwing of the screws to a terminal box (not shown), so that the screws are insulated from current carrying elements.

The cover plate 2 is attached to the frame 1 as will now be described.

Cover plate 2 has a rib 16 which engages the groove 7 on the frame 1 whilst tongue 6 on the frame 1 engages with a cut-out section 17 in a wall of the cover plate. When the rib 16 is inserted into the groove 7 it is held in position by the pressure of the side walls 4 and 5.

To disengage the cover plate a tool whatever can be inserted between the tongue 6 and an edge 18 of the cut-out section 17 so as to act as a lever, thus disengaging the groove 7 and the rib 16.

In FIGURES 4 and 5 a frame 19 and a cover plate 22 are shown in an arrangement for mounting only one electric device. Holes 20 and 21 are arranged at the top and bottom of the frame for the passage of screws. Also on frame 19 there are provided tongues 6 and grooves 7, further slots 8 which are of a similar embodiment to those in FIGURES 1, 2, 3 and 6. The cover plate 22 likewise has ribs 16 and cut-outs 17 which cooperate with the tongues 6 and grooves 7 of the frame.

What I claim is:

1. A cover assembly, particularly for an electrical outlet box, comprising, in combination, a frame adapted to be mounted flush with a surface of a support and having an exposed front face and a pair of exposed side faces extending to one side of said front face inclined thereto; a cover plate for covering said frame and including a rear edge portion, a front portion and a pair of side portions, said portions being respectively adapted to overlie said surface, said front face and said side faces in juxtaposition therewith; cooperating male and female coupling elements provided on the associated side faces and side portions and engageable with a snap action for installing said cover plate on said frame, said coupling elements engaging with a force sufficient to prevent removal of said plate by finger pressure; and release means provided on said frame and said cover plate and accessible only from the exterior of said cover plate in the installed condition of the latter for enabling disengagement of said cooperating male and female coupling elements in response to manipulation of said release means with a tool.

2. A cover assembly as defined in claim 1, wherein said frame and said cover plate are rigid and wherein said release means comprises a cut-out provided in at least one of said side portions, a tongue provided on said frame and extending from the associated side face into said cut-out in the installed condition of said cover plate so as to be accessible from the exterior of the latter, and slot means provided in said frame adjacent said tongue for enabling deflection of said tongue and consequent actuation of said release means in response to manipulation with a tool.

3. A cover assembly as defined in claim 1, wherein said frame and said cover plate are rigid, and wherein said side portions each have an inwardly directed face juxtaposed with an associated side face of said frame in the installed condition of said cover plate; said cooperating coupling elements on each pair of associated faces comprising an elongated projecting rib on one face and an elongated complementary groove in the other face adapted to receive said rib and further comprising slot means provided in said front face of said frame inwardly adjacent said side faces and parallel thereto for enabling deflection of said side from and dislodging of said ribs from said grooves in response to manipulation of said release means with a tool from the exterior of said cover plate.

References Cited

UNITED STATES PATENTS

| | | | |
|---|---|---|---|
| 2,934,590 | 4/1960 | Thompson et al. | 174—53 |
| 2,998,500 | 8/1961 | Di Carlo | 200—168 |
| 3,193,132 | 7/1965 | Gray | 174—66 |
| 3,296,404 | 1/1967 | Stevens | 174—66 |
| 2,169,996 | 8/1939 | Edwards | 200—168 |
| 2,740,873 | 4/1956 | Cronk | 174—66 |
| 3,197,549 | 7/1965 | Good | 174—66 |

ROBERT K. SCHAEFFER, *Primary Examiner.*

H. O. JONES, *Assistant Examiner.*